United States Patent
Hansen et al.

(10) Patent No.: US 7,913,162 B2
(45) Date of Patent: Mar. 22, 2011

(54) SYSTEM AND METHOD FOR COLLABORATIVE ANNOTATION USING A DIGITAL PEN

(75) Inventors: Gary G. Hansen, Newtown, CT (US); Jean-Hiram Coffy, Norwalk, CT (US); Michael Christoff, San Francisco, CA (US); Shen-Yuan Jiang, East Rockaway, NY (US)

(73) Assignee: Pitney Bowes Inc., Stamford, CT (US)

(*) Notice: Subject to any disclaimer, the term of this patent is extended or adjusted under 35 U.S.C. 154(b) by 1321 days.

(21) Appl. No.: 11/312,312

(22) Filed: Dec. 20, 2005

(65) Prior Publication Data

US 2007/0143663 A1 Jun. 21, 2007

(51) Int. Cl.
*G06F 17/22* (2006.01)
(52) U.S. Cl. ...................................... 715/230
(58) Field of Classification Search .................. 715/751
See application file for complete search history.

(56) References Cited

U.S. PATENT DOCUMENTS

| | | | | |
|---|---|---|---|---|
| 5,577,188 A * | 11/1996 | Zhu | | 715/745 |
| 5,581,682 A * | 12/1996 | Anderson et al. | | 715/236 |
| 5,671,428 A * | 9/1997 | Muranaga et al. | | 715/751 |
| 5,692,073 A * | 11/1997 | Cass | | 382/219 |
| 5,897,648 A * | 4/1999 | Henderson | | 715/210 |
| 6,262,728 B1 * | 7/2001 | Alexander | | 345/440.1 |
| 6,279,014 B1 * | 8/2001 | Schilit et al. | | 715/234 |
| 6,332,144 B1 * | 12/2001 | deVries et al. | | 707/102 |
| 6,766,942 B1 * | 7/2004 | Silverbrook et al. | | 235/375 |
| 6,865,284 B2 * | 3/2005 | Mahoney et al. | | 382/112 |
| 6,889,896 B2 * | 5/2005 | Silverbrook et al. | | 235/375 |
| 7,218,783 B2 * | 5/2007 | Bargeron et al. | | 382/188 |
| 7,508,354 B1 * | 3/2009 | Sanders et al. | | 345/1.1 |
| 2001/0051890 A1 * | 12/2001 | Burgess | | 705/9 |
| 2002/0054778 A1 * | 5/2002 | Ericson et al. | | 400/76 |
| 2002/0078088 A1 * | 6/2002 | Kuruoglu et al. | | 707/512 |
| 2002/0169986 A1 * | 11/2002 | Lortz | | 713/201 |
| 2003/0001020 A1 * | 1/2003 | Kardach | | 235/494 |
| 2003/0070139 A1 * | 4/2003 | Marshall et al. | | 715/512 |
| 2003/0093757 A1 * | 5/2003 | Silverbrook et al. | | 715/512 |
| 2004/0139391 A1 * | 7/2004 | Stumbo et al. | | 715/512 |
| 2004/0194021 A1 * | 9/2004 | Marshall et al. | | 715/512 |
| 2004/0216032 A1 * | 10/2004 | Amitay et al. | | 715/500 |
| 2004/0237033 A1 * | 11/2004 | Woolf et al. | | 715/512 |

(Continued)

OTHER PUBLICATIONS

Decurtins et al.; Putting the Gloss on Paper: A Framework for Cross-Media Annotation; The New Review of Hypermedia and Multimedia; vol. 9, Issue 1, 2003; pp. 36-55.*

(Continued)

*Primary Examiner* — Doug Hutton
*Assistant Examiner* — Frank D Mills
(74) *Attorney, Agent, or Firm* — George M. Macdonald; Steven Shapiro; Charles R. Malandra, Jr.

(57) ABSTRACT

A method and system for collaborative annotation by team members of a master document using a digital pen system is described. At least one hardcopy printout of the master document is printed on digital paper used with a digital pen system. Using the digital pen, annotations are made to the hardcopy representation. The user may then select which of the annotations may be shared with each of the particular team members. In another example, the user may select annotations for promotion onto an action item cover sheet.

19 Claims, 5 Drawing Sheets

U.S. PATENT DOCUMENTS

| | | | |
|---|---|---|---|
| 2004/0252888 A1* | 12/2004 | Bargeron et al. | 382/188 |
| 2005/0022122 A1* | 1/2005 | Barrus et al. | 715/530 |
| 2005/0060644 A1* | 3/2005 | Patterson | 715/505 |
| 2005/0138541 A1* | 6/2005 | Euchner et al. | 715/512 |
| 2005/0223315 A1* | 10/2005 | Shimizu et al. | 715/512 |
| 2005/0243369 A1* | 11/2005 | Goldstein et al. | 358/1.18 |
| 2005/0281437 A1* | 12/2005 | Fruchter et al. | 382/113 |
| 2006/0026502 A1* | 2/2006 | Dutta | 715/511 |
| 2006/0048047 A1* | 3/2006 | Tao | 715/512 |
| 2007/0047780 A1* | 3/2007 | Hull et al. | 382/124 |
| 2007/0055926 A1* | 3/2007 | Christiansen et al. | 715/512 |

OTHER PUBLICATIONS

Guimbreitere, Paper Augmented Digital Documents, 2003, ACM UIST '03, pp. 51-60.*

Miura et al., Augmented Classroom: A Paper-Centric Approach for Collaborative Learning System, Aug. 29, 2005, Springer-Verlag, Lecture Notes in Computer Science vol. 3598, pp. 104-116.*

Decurtins et al., Digital Annotation of Printed Documents, 2003, ACM CIKM '03, pp. 552-555.*

Agosti et al., ILAS: A Digital Library Annotation Service, 2005, International Workshop on Annotation for Collaboration, pp. 1-10.*

Conroy et al., Proofrite: A Paper-Augmented Word Processor, 2004, ACM UIST '04, pp. 1-2.*

Norrie et al., Web-Based Integration of Printed and Digital Information, 2002, Springer-Verlag, Lecture Notes in Computer Science vol. 2590, pp. 200-219.*

Weng, et al., Asychronous Collaborative Writing Through Annotations, 2004, ACM CSCW '04, pp. 578-581.*

* cited by examiner

FIG. 6
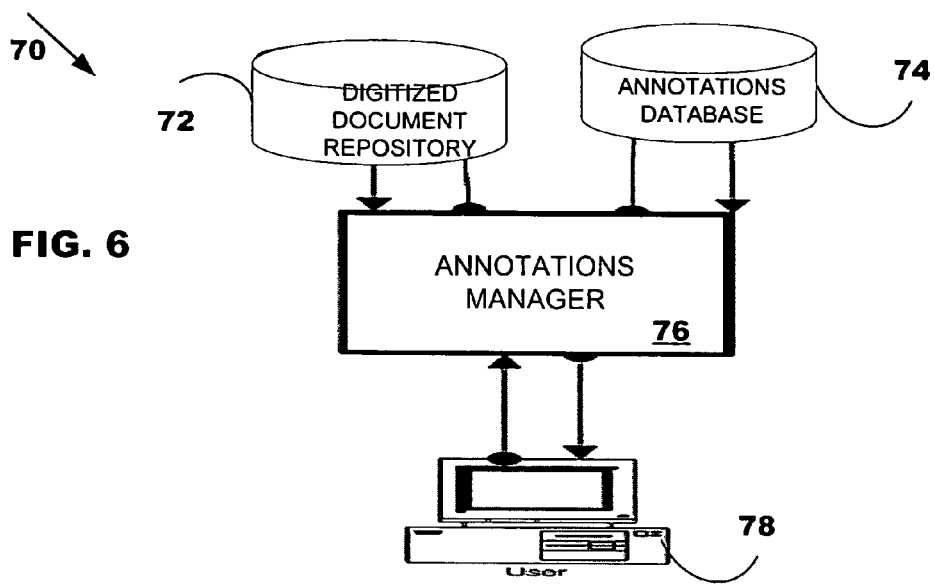
FIG. 7
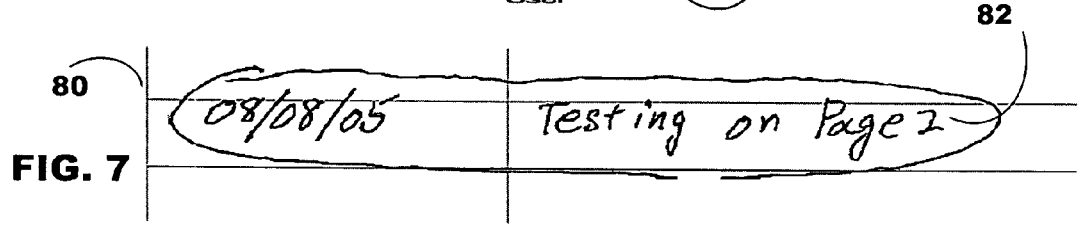
FIG. 8

SYSTEM AND METHOD FOR COLLABORATIVE ANNOTATION USING A DIGITAL PEN

CROSS REFERENCE TO RELATED APPLICATIONS

The present application is related to co-pending, commonly owned U.S. patent application Ser. No. 10/707,582, filed Dec. 22, 2003, entitled SYSTEM AND METHOD FOR ANNOTATING DOCUMENTS, which is incorporated herein by reference.

FIELD OF THE INVENTION

The illustrative embodiments described in the present application are useful in systems including those for document modification and workflow and more particularly are useful in systems including those for collaborative annotation of documents including selective sharing of annotations and selective creation of action item events.

BACKGROUND

Documents are often created by groups of people that collaborate through iterations of additions, changes and suggestions. Team collaboration is often used when creating or maintaining documents. A principle author may create an original document. Similarly, a principle author may create an initial draft of a document. The principle author typically uses a processing system such as a personal computer with document creation software installed. Once created, the document may be circulated to several team members for annotation. Typically, hardcopy paper printouts are circulated to the team members. The team members then each mark the document as needed and forward the annotations to the principle author or another designated person so that the updates and comments may be processed.

The processing system typically includes a personal computer such as an INTEL PENTIUM ® based personal computer using the MICROSOFT WINDOWS XP ® operating system. A physical hardcopy printout of the electronic master version of the document may be created using a laser or inkjet printer. Computer systems are typically used to edit and publish each revision of the document. The documents are often word processor data files used with a word processor and the computer systems typically include word processing programs such as MICROSOFT ® WORD ® (hereinafter "WORD") manufactured by Microsoft Corporation of One Microsoft Way, Redmond, Wash. However, the documents may also include, but are not limited to, business reports, contracts, legal briefs, articles, books, speeches, reports, slide show presentations, financial reports, technical drawings, sales, marketing and advertising materials.

In a traditional document collaboration effort, a principle author or editor creates an original document draft. The copies of the draft are circulated to the group and a member of the group is assigned the task of updating the draft to a new version. The group members typically provide change suggestions or comments by annotating the paper copy and returning it to the editor. The task of updating is usually performed by the principle author or editor and may include adding information, deleting information and/or changing information. There may be many hardcopy comment versions to reconcile and the process may be cumbersome. Furthermore, two or more of the suggestions may present a conflict and the member updating the draft may decide to enter the competing versions as alternatives or resolve the conflict. The process may be iterative as the editor circulates subsequent drafts for comment until the document is finalized.

The draft versions are typically hand-delivered or circulated by mail. More recently, document teams have begun using word-processing systems such as WORD that include some collaborations features. For example, draft versions of WORD documents may be distributed electronically. The team members may enter suggested changes and comments using the Track Changes feature of WORD. The editor then decides which changes to accept. The editing/annotation process may be accomplished in a round-robin fashion, with one single electronic copy circulated to each team member in a serial fashion. Such a system requires that the team members utilize a computer equipped with WORD and may also require that only one team member at a time manually checkout the document to enter suggestions.

Such traditional annotation methods are cumbersome, time-consuming and error-prone when the number of recipients is more than a very small number. Furthermore, such traditional methods do not provide for selective sharing of annotations and for selective creation of action item entries based upon annotations.

SUMMARY OF THE INVENTION

The present application describes systems and methods for providing a document annotation manager system for use in team collaboration environment and for providing for selective sharing of annotations in the collaborative environment. Using a digital paper and paper system (DPP), an electronic document is associated with the special digital paper that is used for hardcopy printouts. Each team member may annotate the document using a digital pen. Using the illustrative embodiments described herein, the team member may then selectively choose which annotations to share with which team members. The globally selected annotations are then each displayed with the electronic version of the original draft together with an identifier listing the particular team member and a time stamp for the annotation. The non-globally selected annotations are then displayed as an overlay with an appropriate privacy notice on the electronic versions viewed by only the selected team members.

In a further illustrative embodiment, the user may select a subset of annotations in order to create an action item list such as promoted annotations on a cover page or action item data entries that may be exported to a calendaring system.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 6 is schematic representation of an Annotations Viewing System (AVS) that is used with an Annotations Processing System (APS) including an Advanced Commenting System (ACS) used with a DCS for action item creation according to an alternative illustrative embodiment of the present application.

FIG. 7 is a top view of a portion of an annotated DPP page for use with the AVS of FIG. 6.

FIG. 8 is a top view of the DPP page of FIG. 7.

DETAILED DESCRIPTION

Figure 1:
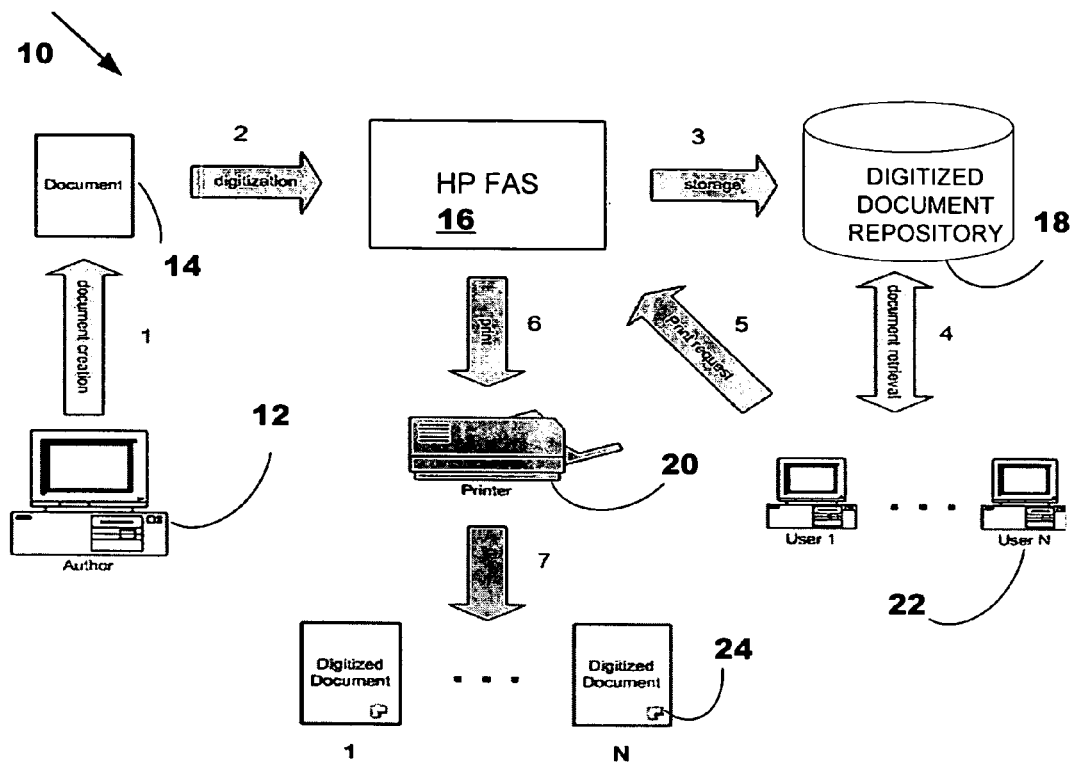
FIG. 1 is a schematic representation of a Digital Pen and Paper (DPP) Document Creation System (DCS) used in the annotation management system for selective annotation sharing according to an illustrative embodiment of the present application.

Illustrative embodiments describing systems and methods for the collaborative annotation of documents are described. Digital Pen and Paper systems (DPP) allow a user to capture or digitize handwriting or pen strokes that the user writes on a medium such as a piece of paper by using a processor such as a personal computer. DPP systems include the Sony-Ericsson CHA-30 CHATPEN and ANOTO paper available from Anoto AB of Sweden. However, other digital pen systems may also be utilized. The illustrative embodiments are described with reference to several examples. Furthermore, the embodiments include alternatives such as including the illustrative embodiments of co-pending, commonly owned U.S. patent application Ser. No. 10/707,582, filed Dec. 22, 2003, entitled SYSTEM AND METHOD FOR ANNOTATING DOCUMENTS, which is incorporated herein by reference.

Traditional physical documents are often used in a team environment for collaboration among team members. The systems and methods described in the above reference patent application provide Digital Pen and Paper (DPP) based annotation manager systems. A system described there utilizes a digital pen is distributed to each member of a team along with a hard copy of the document. Each member of the team may write annotations on a common hard copy of the document or an individual copy of the document. Such annotations would be transferred from the physical realm to the digital realm and they would be merged with the original digital document.

Traditional pen and paper tools adequately support groups that are working with a single copy of a document and only need to view the annotations on or near creation time. With all members of the team present in one location, it is easy to identify and/or clarify annotations from the team member even before they are written. However, this is not always the most practical or the most convenient approach for a group.

For example, a user may prefer that her annotations remain private or be shared with only a subset of a team. Accordingly, she may wish to share a subset of her notes with specific individuals. Additionally, a user may want to organize annotations and/or generate action items directly from her handwritten notes. In a traditional paper environment, the user's notes on the paper would be static and inflexible by nature. In the methods and systems described herein, the user is provided a system for manipulating the electronically captured pen stroke annotations to allow organization of the comments and action item creation.

Selective Sharing Annotation Manager System

Referring to FIGS. 1-6, a system for selective sharing of DPP annotations is described. The illustrative systems and methods described provide a document annotation manager system for use in team collaboration. Using digital paper, an electronic document is associated with the special digital paper and hardcopy printouts are created using the digital paper. Each team member may annotate the document using a digital pen. Using the illustrative embodiments described herein, the team member may then selectively choose which annotations to share with which team members. The globally selected annotations are then each displayed with the electronic version of the original draft together with an identifier listing the particular team member and a time stamp for the annotation. The non-globally selected annotations are then displayed as an overlay with an appropriate privacy notice on the electronic versions viewed by only the selected team members.

Referring to FIG. 1, a schematic representation of a Digital Pen and Paper (DPP) Document Creation System (DCS) 10 used in the annotation management system for selective annotation sharing according to an illustrative embodiment of the present application is shown. The systems described effectively provide a user the ability to share her digitally captured handwritten content (e.g., notes) selectively with other individuals. Furthermore, the systems allow a user to efficiently identify content (e.g., notes) such as important items from the document content to promote to action items that can be assigned to the user or other individuals on the team for follow on action. Using a FAS system that supports electronic authoring, printing, and analog to digital conversion of written annotations, the systems described here provide a better solution than simply merging all electronic annotations into one master copy. As described herein, the system intelligently groups and uniquely marks annotations. Once the annotations are grouped they can also be processed by commercially available handwriting recognition software (e.g., RiteScript™ from EverNote or MyScript™ technology from Vision Objects) that converts pen strokes from a user to ASCII text format. The annotations can then be much more easily read and made searchable after having successfully converted them to text and logically grouped.

The illustrative DCS configuration shown includes an author's personal computer 12 and the original author of a DPP annotation capable document uses an application on the PC 12 such as ADOBE PDF (or MICROSOFT WORD) in step 1 to create the original version of document 14. The document 14 may be printed, but it may also be transmitted electronically in step 2. The DPP processing system in the illustrative embodiment is an instance of the HP FORMS AUTOMATION SYSTEM (HP-FAS) 16 available from Hewlett Packard Company of Palo Alto, Calif. In step 3, the document is sent to storage in the Digitized Document Repository 18. In step 4, a user from a collaborative group of users with personal computers and communications access to the DCS 10 retrieves the document. In step 5, a user sends a print request to the FAS 16. In step 6, the FAS 16 sends a print command to DPP printer 20 that is capable of printing digital paper such as ANOTO paper. In step 7, the digitized document hard copies 24 are provided to the users.

Figure 2:
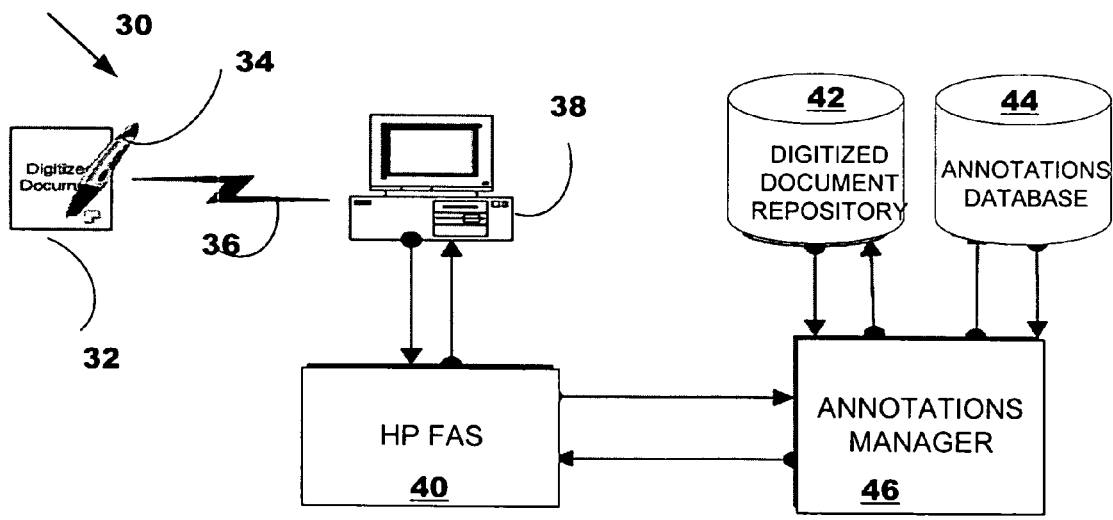
FIG. 2 is schematic representation of an Annotations Processing System (APS) including an Advanced Commenting System (ACS) used with the DCS of FIG. 1 according to an illustrative embodiment of the present application.

Referring to FIG. 2, a schematic representation of an Annotations Processing System (APS) 30 including an Advanced Commenting System (ACS) used with the DCS 10 of FIG. 1 according to an illustrative embodiment of the present application. As can be appreciated, an Annotations Database 44 and an Annotations Manager 46 are added to the system of FIG. 1. An illustrative digitized document 32 is annotated using digital pen 34. The annotations are communicated across wireless channel 36 to personal computer 38. In an alternative, the annotations are transferred to the personal computer 38 using a pen docking system. The annotations may then be displayed with the electronic version of the original draft together with an identifier for the particular team member and a time stamp for the annotation. The personal computer 38 is connected to the FAS system 40 that is connected to the Annotations manager 46 that is connected to the Digitized Document Repository 42 and the Annotations Database 44. In an alternative, each of the components 40, 42, 44 and 46 may reside on a single computer.

Sharing specific pieces of annotations on any part of any page can prove to be a difficult challenge. This system overcomes the challenges presented utilizing several techniques including using a special DPP cover sheet as described herein. Alternatively, the left margins of every page of a DPP document are reserved for checkboxes used to indicate a user's intent to share the annotations. In another alternative, the system may utilize gesture recognition of editorial annotations (e.g., *, & %, #, etc.) to mark notes that are to be shared and to indicate which team members should be allowed access to the notes. The system aggregates the annotation digital pen strokes electronically to generate the final version of the electronic document that mimics the physical one. The annotation pen strokes contain information that is useful to identify and manipulate the content. Hence, the user is able to lift digital content onto front of the document in electronic realm. Thereafter, the key contents such as comments, action items, and others can be identified.

This system provides a model in which users can freely annotate a document independent of other members of the group. Once the annotations are made on the same physical document or any other copy of the document, the annotations can be viewed electronically through the system. Users also have the option to share all or specific pieces of their annotations with the entire group or only certain members of the group, thereby supporting privacy and simultaneous collaboration. Annotations are also converted to ASCII text, which allows the user to read annotations more easily and search them if needed. If a user selects to share an annotation with the entire team, it is a public annotation at least in terms of being publicly available to all of the team members. If any team member is not included in the distribution for a particular annotation, the annotation is a non-public annotation. In that case, the annotation has a distribution profile that determines who can access the annotation. The system may render separate versions of the underlying document for each team member based upon the distribution profile for each annotation or may render them when requested by a team member.

In the illustrative system described here, each user is assigned a personal digital pen. The user can then use that pen to make annotations on any digital document create using the DCS. When the user is done annotating a document, the annotation pen stroke information stored on the pen must be downloaded to a corresponding computer such as a desktop computer, a laptop, or a cell phone. The information may be transferred in real time over a wireless link or in some batch mode when the pen is physically docked with the corresponding computer. Once the information is downloaded from the pen and sent to the APS via the HP-FAS service controller, the annotations are stored in a database. A rendering is created for the newly annotated document and any shared documents that may be affected. The user or any team member with authorization may then view the annotations through the AVS.

The APS incorporates much of the functionality described relating to the enhanced sharing of annotations according to the illustrative embodiments described here. When a user is merely viewing her annotations, the system merges the annotations with the background image in a straightforward manner. A different approach is applied when viewing annotations from more than one user merged together. In this embodiment, each team member is registered with the system as a participant in the particular collaboration effort associated with the DPP Document. During the registration process, each pen is assigned a unique annotation color and each pen is associated with a user. All strokes that are made with the pen assigned to a particular user will appear digitally in the assigned color. This approach provides for quick identification if you know which color is assigned to each user.

Figures 3, 4, 5:
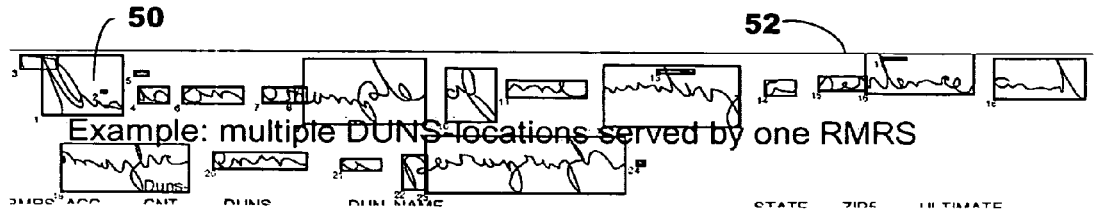
FIG. 3 is a top view of an annotated DPP page for use with the APS of FIG. 2.
FIG. 4 is a top view of an annotated DPP page for use with the APS of FIG. 2.
FIG. 5 is a top view of a DPP cover page for use with the APS of FIG. 2 for selective sharing of annotations.

Referring to FIG. 3, a top view of an annotated DPP page 52 for use with the APS of FIG. 2 is shown to illustrate annotation pen stroke bounding boxes 50 for a sentence. In addition to a color scheme described above, the APS implements an Advanced Commenting System [ACS]. The ACS allows independent identification of annotations without a color key. In addition, the ACS provides the date and time when the annotations were made and the ASCII representation of the text in the annotations. To accomplish this, the ACS utilizes a smart grouping algorithm. The HP-FAS system and similar coordinate based DPP based systems provide the developer with bounding boxes for all of the strokes made on a page. A stroke is defined by pressure. When pressure is applied to the tip of the pen a stroke is recorded. The end of the stroke is defined when the pressure is released. A date and time stamp are recorded when the stroke begins and when the stroke ends.

One approach for processing the pen strokes would be to add the proper date/time stamp and user information to every stroke. However, that approach would make the document extremely cluttered. Natural handwriting involves lifting up the pen (and thus discontinuing pressure) various times when writing or drawing. This natural property of writing or drawings creates a need for the system to logically group the strokes. The ACS intelligently groups strokes by scoring each of the strokes relative to each other based on how "related" they are. The term "related" refers to how likely two strokes were intended by the user to be a single annotation. This relatedness property has temporal as well as spatial components. It is understood that that 2 or more strokes are related if they are relatively close to one another in time and in space.

The following algorithm is used to estimate the temporal relatedness of 2 or more pen strokes by the following equation:

$$TR = K1 * K2/(TimeDiff)^2 \quad\quad (EQ. 1),$$

where K1 is a constant that is calibrated according to the following formula:

$$K1/(TimeDiff)^2 = 1 \text{ for TimeDiff} = 1 \text{ sec} \quad\quad (EQ. 2),$$

where TimeDiff is a parameter that represents the difference the recorded start and times of 2 strokes. This constant allows the time factor to decay very quickly for values greater than 1 second. For values below 1 second, K1 magnifies the time factor. K2 is the relative weight of time dependency with respect to the distance factor. In this illustrative example, K2 is set to 0.1.

A different algorithm is utilized to determine spatial relatedness according to the following formula:

$$SR = K3 * K4/ShortestDistance \quad\quad (EQ. 3),$$

where K3 is a constant that is calibrated according to the following formula:

$$K2/shortestDistance = 1 \text{ for ShortestDistance} = \frac{1}{4} \text{ in}$$
$$(85dpi/4) \quad\quad (EQ. 4),$$

where K4 is the weight of the distance factor relative to the time factor. In this illustrative example, K4 is set to 0.90. K3 allows the space factor to decay slower than the time factor for values greater than ¼ inch. For values below ¼ inch, K3 amplifies the space factor. The parameter Shortest Distance is computed from yet another algorithm that computes the shortest spatial distance between two boxes, where there exists one reference box located in Cartesian coordinate space and a target box that may be located at an arbitrary location in the vicinity of the reference in 2D space. In this context individual strokes or groups of strokes are said to be related if the following test is met according to this equation:

$$\text{SCORE}=TR+SR>\text{some threshold value} \quad (\text{EQ. 5}).$$

If the SCORE value for a stroke exceeds a certain threshold, then they are said to be "related" and therefore grouped together. The related score is essentially a formula based on the distance a time between strokes. The thresholds may be discovered by experimentation.

Referring to FIG. 4, a top view of an annotated DPP page 54 for use with the APS of FIG. 2 is shown with a comment field 56. Once strokes are effectively grouped such as shown in relation to FIG. 3, the strokes can be processed by a handwriting recognition engine and added to the comment in searchable ASCII form. This not only helps the user read written text much easier, but also affords them searching capabilities. When a comment or other selected content has been selected for sharing, the comment can be processed. In one configuration, the selected comment is merged onto a blank page in the electronic world, in which case all context surrounding the content is lost. Alternatively, the selected comment may be rendered onto an image of the page on which the note(s) was made, thereby preserving context. In yet a further alternative, the selected comments may be stored on a blank page or layer and associated with the original page by relative location or some other association method. Additionally, notes from other users may also be merged onto the same image. However, merging comment strokes from multiple users introduces the possibility of comment stroke collision if there are two comment strokes written on the same location of the underlying document.

When two or more team members are collaborating and annotating different physical copies of the same underlying document, they may write annotations in the same area of a page. If these annotations are simply transferred to the electronic realm and merged down onto the page without further processing, it would be very hard to tell what each user wrote because their strokes collide. In order to avoid the collision problem, the APS utilizes a hierarchy of users in which each team member has a corresponding rank. When annotations from two separate users collide, the annotation from the user with higher rank will be shown on the final copy and the other will be ignored. Alternatively, the second annotation may be indicated in the margin or by providing a note indicating where it can be found.

If annotations from two or more users with the same rank collide, then the APS separates the annotations so that they will each fit on the page and will not interfere with each other. The system does this by first properly grouping the strokes of the annotations as described above with reference to the ACS, and then by scaling and positioning the annotations so that they fit on the page and each can be seen. Furthermore, two additional separate versions of the document are made available each including the original annotations fro the two users.

Referring to FIG. 5, a top view of a DPP cover page 60 for use with the APS of FIG. 2 for selective sharing of annotations is shown. The cover sheet 60 includes a selective sharing instruction section 62 that includes check boxes for selectively sharing certain annotations with some or all of the team members and for sharing all of the annotations with some or all of the team members. If the user intends to selectively share annotations, there is an instruction section showing an illustrative annotation before it is selected for sharing 64 and after it is selected for sharing 66.

It has been established that system users do not always want to share all of their annotations with the entire team. Accordingly, it would be beneficial to allow the user to be able to share all or some of the annotations selectively. In this system, a special DPP cover sheet 60 is used to determine how the user wishes to share annotations. Alternatively, similar selection tools can be added in the margins of the physical pages to perform the same function. Therefore, the user is provided with a mechanism to decide which annotations to share with which team members. In order to share specific annotations, the user selects the proper command on the cover sheet and then draws a box around the annotation or annotations that the user wants to share. The box is interpreted as a command to the APS and will not be displayed in the electronic draft of the annotation. As can be appreciated, additional selection mechanisms may be utilized.

Referring to FIG. 6 a schematic representation of an Annotations Viewing System (AVS) 70 that is used with an Annotations Processing System (APS) including an Advanced Commenting System (ACS) used with a DCS for action item creation according to an alternative illustrative embodiment of the present application is shown. As can be appreciated, an Annotations Database 74 and an Annotations Manager 76 are added to the system of FIG. 1 with the associated user computer 78 and Digital Document Repository 72. In the Forms Automation System, the electronic document content is generated by digital pen strokes and the pen strokes include timestamp and boundary information for stroke identification purposes. In this embodiment, a user selects certain annotations to be promoted to a cover page because they are important annotations. Additionally, the user may select a subset of annotations in order to create an action item list such as action item data entries that may be exported to a calendaring system.

While there are many possible methods for selecting comments for promotion, the illustrative example allows the user to identify the content she intends to convert to action items by circling the content with a bounding stroke. The strokes located within the bounding stroke are considered as the candidates for content rendering. These strokes rendered to image files, and then finally merge onto a digital document such as PDF. The main purpose of this aspect of the system is to allow the user to copy (promote) her comments from the document body onto the front of the electronic rendering of the document in question. Accordingly, the activity is referred to as Content Promotion.

Referring to FIG. 7, a top view of a portion of an annotated DPP page 80 for use with the AVS of FIG. 6 is shown. The selected annotations 82 are enclosed by a selection stoke. Referring to FIG. 8, a top view of the DPP page 80 of FIG. 7 is shown having the comment 82 shown in the context of the entire page 80.

Figure 9:
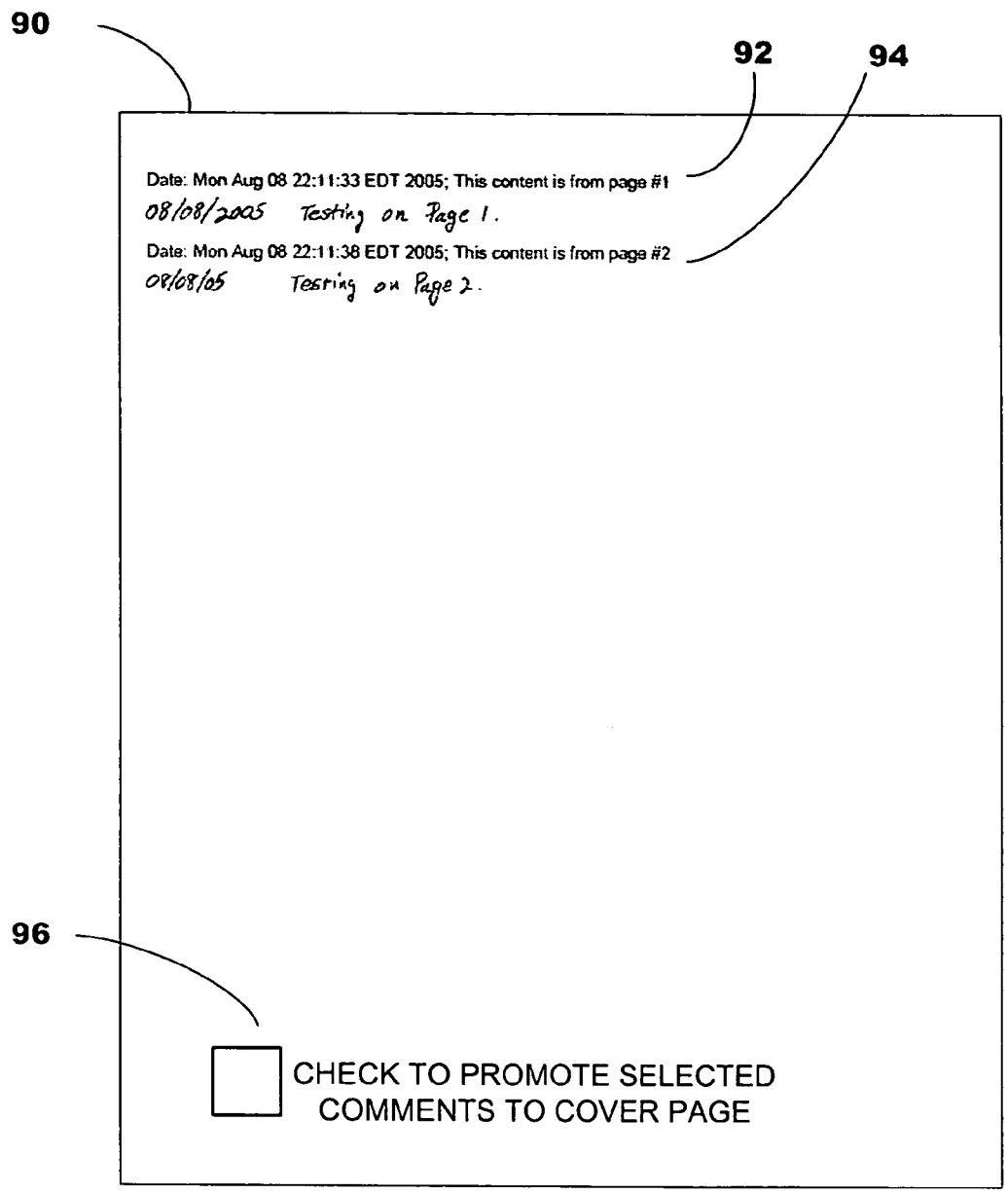
FIG. 9 is a top view of a DPP cover page used for content promotion and action item creation with the AVS of FIG. 6.

Referring to FIG. 9, a top view of a DPP cover page 90 used for content promotion and action item creation with the AVS of FIG. 6. the cover page includes an instruction section 96 used to trigger the content promotion activity. After the check box in section 96 is selected, the user then circles comments 92, 94 that are shown promoted to the cover page 90. The promoted comments can be used as action items or they can be exported to an action item processing program such as the LOTUS NOTES groupware program.

FIG. 9 is a representative example of a potential cover page 90. As described above, the user starts out by indicating her intention by checking the checkbox. If the checkbox is not checked, then the system will process the pen strokes according to whatever default processing logic is in place. If the checkbox is checked, the content promotion logic is triggered. Several methods may be used to achieve content promotion as mentioned earlier. The following two examples use slightly different methods to achieve content promotion functionality. In a first content promotion example, the user takes notes (annotations) with the digital pen in a normal fashion. The user then circles the annotations that are to be promoted. Then, the user checks the Content Promotion checkbox on the cover page. Finally, the user docks the digital pen in the cradle and the system processes the content promotion algorithm to bring a copy of the circled annotations to the cover page in the order that they were circled. Alternatively, the annotations may be promoted in the order that they sequentially appear in the document.

In a second content promotion example, the user takes notes (annotations) with the digital pen in a normal fashion. The user then checks the Content Promotion checkbox of the cover page. Then, the user circles the annotations to be promoted in a sequential manner on the document body that need to be brought forward. Finally, the user docks the digital pen in the cradle and the system processes the content promotion algorithm to bring a copy of the circled annotations to the cover page in the order that they were circled. The third and forth steps must be completed in order. Furthermore, in the example, the user must circle the contents in a sequential order without being interrupted by any strokes that are not bounding strokes.

The content promotion algorithm includes several steps. Including searching for qualified stroke bounding boxes, rendering the strokes onto a blank page or onto predefined background images and converting the rendered image file or files to a more useful format such as Portable Document Format (PDF).

First, the program searches for qualified bounding strokes. The program gathers all of the pen strokes from the current session and all of those from historical sessions if they exist. Historical sessions for each user on particular document templates are stored in a database and may be retrieved for processing. Each pen stroke contains many parameters including information such as the start and end time of the stroke, the page number of the stroke and the (x, y) coordinates of the stroke. The system then stores or sorts the strokes in time order sequence. Then the system retrieves the latest stroke from the sequence. If the programming is following the first content promotion check box processing example described above, the system finds the latest stroke for whole document and then go through all remaining strokes. The system then finds all strokes in which the bounding falls within the bounding box of the page where the latest stroke is located. These strokes are considered qualified strokes and are then saved to a temporary location that holds strokes targeted for content promotion. After the program loops through the list of strokes on the page, the searching process will stop and the program will move on to the next step if the temporary storage for qualified strokes is empty or if the strokes are located on first page of the document where the check box is located. Otherwise, the stroke will be saved along with its associated end timestamp, bounding box, page number and a list of strokes located within its bounding box.

Secondly, the system renders the qualified strokes onto an image file. The qualified strokes are merged either to blank pages or predefined background images. They are copied to front of the electronic rendering of the physical document and saved in memory. However, the first page of the document 90 that includes the content promotion checkbox requires special rendering. Instead of merging the background image of this page with its strokes, the first page of the document actually generates multiple images where each represents a promoted content. The files for these images are given unique names.

In the third step, the system merges the image files into a PDF file. After the image files are generated, this system merges the image files onto a PDF file using a merging program such as the iText API. In this embodiment, the first page of the PDF file includes all of the promoted content images. The images are organized on the electronic page in time-ordered fashion. Additional information such as, page number and content timestamps are also displayed for user's convenience. The page number and the timestamp are parsed from the file name. The rest of the pages in the PDF file are simply a merger of the background images and the annotation strokes.

Figure 10:
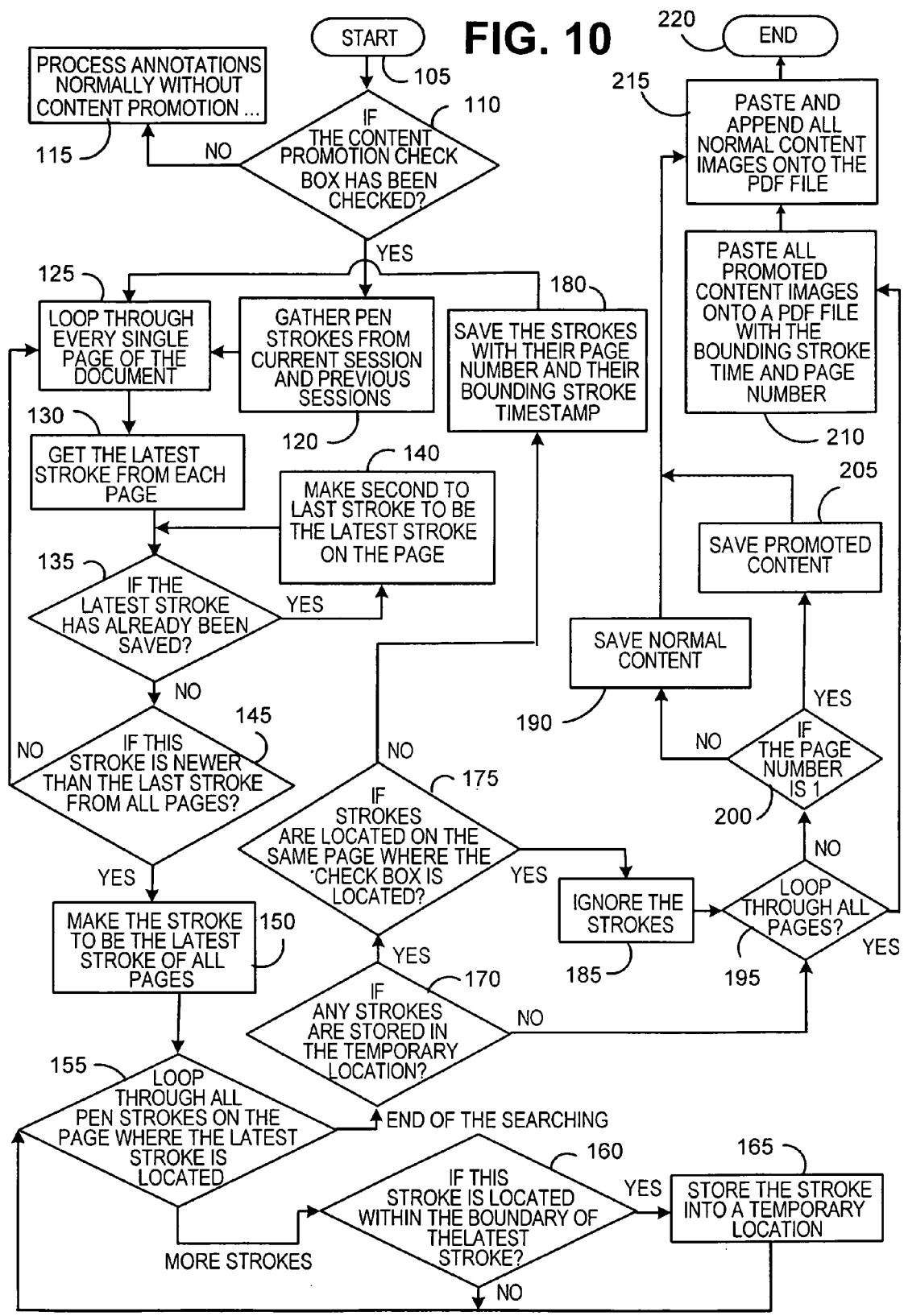
FIG. 10 is a flow chart showing an annotation management process according to another illustrative embodiment of the present application.

Referring to FIG. 10, a flow chart showing an annotation management process 100 according to another illustrative embodiment of the present application is shown. The process starts in step 105. In step 110, the system determines whether the user has selected the content promotion check box. If not, the system loops to step 115 to process annotations normally and to continue to determine if the content promotion box has been checked. If the content promotion box is checked, the system proceeds to step 120 to gather pen strokes from the current user session and any previous sessions related to the document. In step 125, the process starts to loop through every page of the document. In step 130, the process retrieves the latest pen stoke from each page. In step 135, the system determines whether the latest pen stroke had already been saved. If so, the system saves the second to last stroke as the latest pen stroke and returns to step 135. If the latest stroke has not already been saved, the system proceeds to step 145.

In step 145, the process determines whether the current stroke is newer than the latest stroke from all of the pages. If not, the process returns to step 125. If it is, the process proceeds to step 150 and saves the stroke as the latest stroke of all pages. In step 155, the process starts to loop through all pen strokes on the page that includes the latest pen stroke. If there are more strokes, the system proceeds to step 160. In step 160, the system determines whether the stroke is within the boundary of the latest stroke. If it is not, the process returns to step 155. If it is, the system proceeds to step 165 to store the stroke in a temporary location and then returns to step 155. If there are no more pen strokes after step 155, the system proceeds to step 170.

In step 170, the process determines whether any pen strokes are stored in the temporary location. If there are, the system proceeds to step 175. In step 175, the process determines whether strokes are located on the same page that includes the content promotion check box. If not, the system proceeds to step 180 to save the strokes with page number and bounding stroke timestamp. The process then returns to step 125. If strokes are located on the same page in step 175, the process proceeds to step 185 and ignores the pen strokes and then proceeds to step 195. In step 170, if there are no strokes stored in the temporary location, the process proceeds to step 195.

In step 195, the process determines if it has completed looping through all of the pages. If not, the system proceeds to step 200. In step 200, if the page number is not 1, the system proceeds to step 190 and saves the normal content. To save the normal content, the system merges the page background image with the pen strokes on the page. If the page number is 1, the process proceeds to step 205 to save the promoted content. To save the promoted content, the system processes the saved pen strokes and merges them into images using the page number and bounding stroke timestamp as the image file name.

If the system has looped through all of the pages in step 195, the system proceeds to step 210 and pastes all of the promoted content images onto a PDF file with the bounding stroke time and page number. The system then proceeds to step 215 and pastes and appends all normal content images onto the PDF file. Finally, the process ends in step 220.

The illustrative embodiments of the present application are described with reference to a word processing system such as the MICROSOFT® WORD system. However, the embodiments of the present application may be used with other document creation and editing systems such as CAD systems and presentation systems including MICROSOFT® POWERPOINT. The systems described herein may be implemented using computer software development systems such as MICROSOFT VISUAL STUDIO® and using programming languages such as C and C++ with appropriate libraries. Similarly, a commercial product modification tool such as VISUAL BASIC APPLICATIONS (VBA) may be used to modify a commercial application such as WORD. Alternatively, an open source system such as OPEN OFFICE may be modified to perform the functions described herein.

The processing systems used are typically INTEL PENTIUM® based personal computer, but other computers such as MACINTOSH APPLE computers may be used. Similarly, the processing systems may include, but are not limited to, data processors, keyboards, dictation equipment, drawing tablets, pointing devices, mobile computers, tablet computers, Personal Digital Assistants (PDA), cell phones and digital pens.

The illustrative embodiments described herein utilize the HP DP 250 pen system. However, other digital pens including LOGITECH pens may be utilized. Certain digital pen systems utilize an imaging device to scan or record an image of the pen stroke. Other digital pens use mechanical sensors in order to record a pen stroke. Digital pen systems may utilize positioning systems such as light-based scanning systems including infrared (IR) sources and detectors in order to determine an absolute or relative position of the pen. Those pen systems and the digital pen systems include the LOGITECH IO pen system from Logitech of Freemont, Calif., the N-SCRIBE system available from Digital Ink of Wellesley, Mass. and the E-PEN system available from E-Pen InMotion of Matam, Haifa Israel may be utilized. Similarly, digital pointing device systems including the V-PEN system available from OTM Technologies of Herzliya Israel may be used.

The present application describes illustrative embodiments of a system and method for annotating documents. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for managing the annotation of a document comprising:
   obtaining an original document;
   making an original electronic version of the document available to an annotation manager system;
   associating the original electronic version of the document with digital paper;
   printing a plurality of hardcopies of the original electronic version of the document on the associated digital paper;
   distributing the hardcopies to a plurality of team members;
   receiving a plurality of annotations from the team members;
   receiving selective sharing data for at least one selected annotations of the plurality of annotations from the respective team members that authored the respective annotation, wherein the selective sharing data comprises digital pen strokes on the associated digital paper that indicate a selective sharing mode and corresponding annotation selection pen strokes made in the vicinity of the at least one selected annotations;
   associating each public annotation with a location in the original electronic version of the document and a group of team members allowed access to each respective public annotation; and
   associating each non-public annotation with a location in a non-public electronic version of the document.

2. The method of claim 1, further comprising:
   creating a new annotated version of the original electronic version of the document incorporating the public annotations.

3. The method of claim 2, further comprising:
   incorporating annotation metadata into the new annotated version.

4. The method of claim 3, wherein,
   the metadata includes a time and date associated with each annotation; and
   the metadata includes a user identification for each annotation.

5. The method of claim 1, further including:
   anchoring at least one of the annotations to a paragraph of the original electronic version of the document.

6. The method of claim 1, further including:
   determining if any annotations collide.

7. The method of claim 6, further including:
   if annotations collide, determining if annotation priority can resolve the collision, and resolving the collision by ignoring the lower priority annotation.

8. The method of claim 7, further comprising:
   if annotation priority cannot resolve the collision, modifying the annotations to remove the collision.

9. The method of claim 1, further comprising:
   grouping a plurality of pen strokes into each of the plurality of annotations.

10. The method of claim 9, wherein:
    the grouping step utilizes time and space data associated with each pen stroke.

11. The method of claim 1, wherein:
    receiving selective sharing data for each of the plurality of annotations from the team members includes receiving permitted recipient data from a respective author of each respective annotation and the selective sharing data comprises digital pen strokes on the associated digital paper that encircle the at least one selected annotations.

12. A method for managing the promotion of annotations on a digital paper document for a user comprising:
   printing a hardcopy of the original electronic version of the digital paper document on associated digital paper;
   receiving a plurality of annotations from the user by receiving user pen strokes that were placed on the hardcopy;
   receiving a content promotion command indication from the user, wherein the content promotion command comprises user digital pen strokes made on the associated hardcopy that indicate a content promotion command and corresponding annotation selection user pen strokes that were placed on the hardcopy near at least one of the plurality of annotations to indicate content promotion selection of the at least one of the plurality of annotations;
   determining which pen strokes indicate content promotion selection; and
   rendering a duplicate copy of each selected annotation associated with the content promotion selection on a separate content promotion page of the document.

13. The method of claim 12, further comprising:
   exporting action item data based upon the content promotion selection data.

14. The method of claim 12, further comprising:
   incorporating annotation metadata into the rendered copy.

15. The method of claim 12, wherein,
   each content promotion selection is rendered on the content promotion page in the order that the annotation appears in the document.

16. The method of claim 12, wherein,
   each content promotion selection is rendered on the content promotion page in the order that the annotation was selected for promotion.

17. The method of claim 1, further comprising:
   grouping a set of pen strokes as an annotation using a relatedness parameter.

18. The method of claim 17, further comprising:
   determining the relatedness parameter using spatial data related to the pen strokes.

19. The method of claim 17, further comprising:
   determining the relatedness parameter using temporal data related to the pen strokes.

\* \* \* \* \*